US008505054B1

(12) United States Patent
Kirley (10) Patent No.: US 8,505,054 B1
(45) Date of Patent: Aug. 6, 2013

(54) SYSTEM, DEVICE, AND METHOD FOR DISTRIBUTING AUDIO SIGNALS FOR AN AUDIO/VIDEO PRESENTATION

(76) Inventor: Joseph F. Kirley, Wolfeboro, NH (US)

(*) Notice: Subject to any disclaimer, the term of this patent is extended or adjusted under 35 U.S.C. 154(b) by 162 days.

(21) Appl. No.: 12/971,559

(22) Filed: Dec. 17, 2010

Related U.S. Application Data

(60) Provisional application No. 61/390,352, filed on Oct. 6, 2010, provisional application No. 61/385,997, filed on Sep. 24, 2010, provisional application No. 61/288,103, filed on Dec. 18, 2009.

(51) Int. Cl.
 *H04N 7/18* (2006.01)
(52) U.S. Cl.
 USPC ............................................... 725/74
(58) Field of Classification Search
 None
 See application file for complete search history.

(56) References Cited

U.S. PATENT DOCUMENTS

| | | | | | |
|---|---|---|---|---|---|
| 5,867,223 | A | * | 2/1999 | Schindler et al. | 348/552 |
| 6,912,010 | B2 | | 6/2005 | Baker et al. | 348/515 |
| 7,043,749 | B1 | * | 5/2006 | Davies | 725/120 |
| 7,206,367 | B1 | | 4/2007 | Moore | 375/354 |
| 7,614,070 | B2 | | 11/2009 | Urdang et al. | 725/90 |
| 2006/0095471 | A1 | | 5/2006 | Krikorian et al. | 707/104.1 |
| 2007/0143787 | A1 | * | 6/2007 | Cankaya | 725/34 |
| 2008/0059997 | A1 | * | 3/2008 | Plotnick et al. | 725/32 |
| 2009/0178079 | A1 | * | 7/2009 | Derrenberger et al. | 725/42 |
| 2009/0180755 | A1 | * | 7/2009 | Kanemaru et al. | 386/84 |
| 2009/0205008 | A1 | * | 8/2009 | Wollmershauser et al. | 725/131 |
| 2010/0088733 | A1 | * | 4/2010 | Chan et al. | 725/80 |

OTHER PUBLICATIONS

Allen Avionics, Inc., "A&V Delay System," www.allenavionics.com/GPDL/AVDL.htm, © Allen Avionics 2000-2013, 7 pages.
Motron Electronics, "RTS-200C Radiotvsync™ Stereo with Remote [RTS-200C]," $199.95, http://www.motron.com/product_info.php/products_id/133, © 2007-2013 Motron Electronics, 3 pages.

* cited by examiner

*Primary Examiner* — Brian Pendleton
*Assistant Examiner* — Jason K Lin
(74) *Attorney, Agent, or Firm* — Sunstein Kann Murphy & Timbers LLP (57) ABSTRACT

The audio portion of an A/V signal is sent to one or more mobile devices and the video portion of the A/V signal is sent to one or more separate display devices in such a way that the signal provided to the display device(s) contains video information that is delayed by a predetermined amount greater than the expected amount of delay in a communication network over which the audio information is sent to the mobile device(s) so that the audio is received by the mobile device(s) at or before the time the video is displayed on the display device. The signal provided to the display device may include the audio information and/or other information. The amount by which the information provided to the display device (i.e., the video and optionally the corresponding audio and/or other information) is delayed may be fixed or variable/configurable. An application running in the mobile device provides for adding additional delay to the received audio information so that the audio can be synchronized to the corresponding video on the display device. The application may allow the user to manually add the delay to the audio, e.g., using various types of controls, and/or the application may automatically add delay to the audio pursuant to various synchronization protocols.

37 Claims, 5 Drawing Sheets

SYSTEM, DEVICE, AND METHOD FOR DISTRIBUTING AUDIO SIGNALS FOR AN AUDIO/VIDEO PRESENTATION

CROSS-REFERENCE TO RELATED APPLICATION(S)

This patent application claims the benefit of the following United States Provisional Patent Applications, each of which is hereby incorporated herein by reference in its entirety:

U.S. Provisional Patent Application No. 61/390,352 filed Oct. 6, 2010;

U.S. Provisional Patent Application No. 61/385,997 filed Sep. 24, 2010; and

U.S. Provisional Patent Application No. 61/288,103 filed on Dec. 18, 2009.

TECHNICAL FIELD

The present invention relates to synchronizing audio signals on one device with video signals on another device.

BACKGROUND ART

It is known in the prior art to provide multiple television displays in a public setting so that viewers can choose to watch any one of multiple television programs. Sometimes these displays broadcast without any audio or include audio that is difficult to hear in the display's environment. In some settings, these displays may include subtitles, but subtitles may prove difficult to keep up with or may be disharmonious with the displayed video.

It is also known in the prior art to broadcast television and radio simultaneously, in a process often referred to as simulcasting or simultaneous broadcasting. This method of broadcasting, used primarily before TV sound transmission was possible, includes transmitting the audio or sound portion of a television broadcast to a radio, while transmitting the corresponding video portion to a television.

It is also known in the prior art to transmit sound to a device separate from a television display. Hospitals often accommodate such transmissions, for example through an audio system on patient's bed.

While technological advances in television broadcasts have significantly reduced the use of broadcasting techniques such as simulcasting, some of these advances have introduced new challenges and invited opportunity for additional innovations in the wake of social television broadcasting's increasing popularity.

SUMMARY OF VARIOUS EMBODIMENTS

In accordance with one aspect of the invention there is provided a method of processing an audio/video signal by an audio/video processor to allow for synchronization of video and audio information. The audio/video processor is in communication with a communication system for communication with at least one mobile device and in communication with at least one display device. The method involves receiving a first audio/video signal; transmitting a first signal to at least one mobile device over a communication system, the first signal including audio information associated with the first audio/video signal, the communication system causing delayed reception of the audio information by the at least one mobile device; and transmitting a second signal to a display device separate from the mobile devices, the second signal including video information associated with the first audio/ video signal, the video information delayed relative to the audio information in the first signal by a predetermined amount of delay greater than the amount of delay added to the audio information by the communication system, so that the audio information is received by the mobile devices at or before the video information is displayed on the display device and each mobile device can independently adjust the amount of delay it adds to the received audio information to synchronize audio played by the mobile device with the video displayed on the display device.

In accordance with another aspect of the invention there is provided apparatus for processing an audio/video signal to allow for synchronization of video and audio information, the apparatus comprising an audio/video signal receiver; a communication interface for communication with at least one mobile device; a display device interface for communication with a display device; and an audio/video processor coupled to the audio/video signal receiver, the communication interface and the display device interface, the audio/video processor configured to receive a first audio/video signal; transmit a first signal to at least one mobile device over a communication system, the first signal including audio information associated with the first audio/video signal, the communication system causing delayed reception of the audio information by the at least one mobile device; and transmit a second signal to a display device separate from the mobile devices, the second signal including video information associated with the first audio/video signal, the video information delayed relative to the audio information in the first signal by a predetermined amount of delay greater than the amount of delay added to the audio information by the communication system, so that the audio information is received by the mobile devices at or before the video information is displayed on the display device and each mobile device can independently adjust the amount of delay it adds to the received audio information to synchronize audio played by the mobile device with the video displayed on the display device.

In accordance with yet another embodiment of the present invention there is provided an apparatus comprising a computer readable medium having embodied therein a computer program that, when run on a computer, performs processing of an audio/video signal to allow for synchronization of video and audio information, the computer program comprising computer program instructions for receiving a first audio/ video signal; computer program instructions for transmitting a first signal to at least one mobile device over a communication system, the first signal including audio information associated with the first audio/video signal, the communication system causing delayed reception of the audio information by the at least one mobile device; and computer program instructions for transmitting a second signal to a display device separate from the mobile devices, the second signal including video information associated with the first audio/ video signal, the video information delayed relative to the audio information in the first signal by a predetermined amount of delay greater than the amount of delay added to the audio information by the communication system, so that the audio information is received by the mobile devices at or before the video information is displayed on the display device and each mobile device can independently adjust the amount of delay it adds to the received audio information to synchronize audio played by the mobile device with the video displayed on the display device.

In various alternative embodiments, the audio/video source may be received from an internal or external video source.

The audio/video signal may be decoded to recover at least the audio information and optionally also the video information; the first signal may include at least the decoded audio information and the second signal may include at least the decoded video information delayed by the predetermined amount of delay.

The first audio/video signal may be transmitted to both the mobile device(s) and the display device, with the signal transmitted to the display device delayed by the predetermined amount of delay.

The first audio/video signal may be transmitted to an external audio/video processor, which returns processed audio and/or video information. For example, the external processor may return undelayed audio information and delayed audio and video information, where the first signal may include the undelayed audio information received from the external audio/video processor the second signal may include the delayed audio and video information received from the external audio/video processor. Alternatively, the external processor may return a combined audio/video signal including video information delayed relative to the audio information by the predetermined amount of delay, and both the first signal and the second signal may include the combined audio/video signal received from the external audio/video processor. Alternatively, the external processor may return processed audio and video information from the external audio/video processor, where the first signal may include the audio information received from the external audio/video processor and the second signal may include the video information received from the external audio/video processor delayed by the predetermined amount of delay.

In various embodiments, the first signal may further include video information synchronized to the audio information in the first signal, so that each mobile device can independently adjust the amount of delay it adds to the received audio and video information to synchronize audio and video played by the mobile device with the video displayed on the display device.

In various embodiments, the second signal may further include audio information synchronized to the video information in the second signal, so that the display device can play the audio and video together.

In various alternative embodiments, at least one the first signal and the second signal may further include additional information that is not in the first audio/video signal. The additional information may be added by the audio/video processor. The additional information may include an advertisement, which may be selected based on at least one of the location of the mobile device, the identity of the mobile device, the identity of the mobile device user, the content being displayed on the display device, and the nature of the location of the display device. The additional information additionally or alternatively may include a device identifier provided in the second signal, the device identifier enabling mobile device users to identify the display device for selectively receiving the associated audio information.

In various embodiments, the amount of delay added to the video information may be user-configurable.

In various embodiments, upon a change from the first audio/video signal to a second audio/video signal (e.g., when someone changes the television channel), a third signal may be transmitted o the display device, the third signal including video information not associated with the first audio/video signal or the second audio/video signal.

BRIEF DESCRIPTION OF THE DRAWINGS

The foregoing features of the invention will be more readily understood by reference to the following detailed description, taken with reference to the accompanying drawings, in which.

It should be noted that the foregoing figures and the elements depicted therein are not necessarily drawn to consistent scale or to any scale. Unless the context otherwise suggests, like elements are indicated by like numerals.

DETAILED DESCRIPTION OF SPECIFIC EMBODIMENTS

Definitions. As used in this description and the accompanying claims, the following terms shall have the meanings indicated, unless the context otherwise requires:

An "A/V signal" (also sometimes referred to as a "television signal" in certain contexts) is generally an information signal that contains both video and audio content and perhaps other information (e.g., closed captioning information). An A/V signal may be available from any of a variety of sources, such as various sources described below. An A/V signal may include a television broadcast/program, movie, multimedia computer file (e.g., JPEG, MPEG), or other audio/video information. An A/V signal may be transmitted over a communication system (e.g., broadcast television, cable television, satellite television, computer network, etc.). An A/V signal may be stored for later playback (e.g., on a DVD, computer memory, digital video recorder, TV streaming device, etc.). An A/V signal may be available "live" (e.g., a television broadcast, streaming video, etc.) or may be time-shifted and/or placeshifted.

A "mobile device" is a communication device that receives certain signals over a communication network in embodiments of the present invention. A mobile device may be, for example, a smartphone (e.g., iPhone™), personal digital assistant (e.g., Blackberry™), laptop or personal computer, wireless headset (e.g., using an infrared or radio frequency communication link), or other device. A mobile device may receive signals over a wireless network (e.g., WiFi, cellular telephone, BlueTooth, etc.), the Internet, and/or other communication network. A mobile device is not necessarily mobile in the sense that it can be stationary at a given time.

A "TV streaming device" is a device that transmits A/V signals (e.g., television programs) over a communication network such as the Internet, typically for timeshifting and/or placeshifting. Examples of TV streaming devices include the SLINGBOX™ TV streaming device from Sling Media and the LOCATIONFREE PLAYER™ TV streaming device from Sony. Such devices typically allow a remote device to receive a television signal over an existing Internet connection, e.g., from a desktop or laptop computer, smartphone, PDA, or television (via an interface device). Such devices typically also allow the mobile device to control an external television signal source such as a cable/satellite box, e.g., to change channels, control DVR functions, etc.

An "A/V signal source" is a source of a video or A/V signal. Examples of A/V signal sources include a terrestrial television broadcast received via a television antenna, analog cable, a digital cable box, a satellite receiver, a digital video recorder (DVR), a DVD player, a Video Cassette Recorder (VCR), a computer, a video game console, a video camera or camera phone, a TV streaming device, or other A/V signal source.

A "display device" is a device that displays video. A display device may be a television, monitor, computer, projector, kiosk, or other type of display device. A display device may play audio, display text (e.g., closed captioning), and/or perform other functions.

In illustrative embodiments of the present invention, the audio portion of an A/V signal is sent to one or more mobile devices and the video portion of the A/V signal is sent to one or more separate display devices. The mobile device(s) may receive the audio portion over a wireless network (e.g., via WiFi) or other communication network (e.g., the Internet), which inherently adds delay. Consequently, a simultaneous transmission of an unaltered video signal to the display device(s) and the audio signal to the mobile device(s) would result in the audio portion arriving at the mobile device(s) later than the video arrives at the display device(s). The uncoordinated arrival of the video and the audio would result in an incoherent viewing experience in which the audio rendered by the mobile device(s) lags behind the video displayed on the display device.

Accordingly, in embodiments of the present invention, the signal provided to the display device contains video information that is delayed by a predetermined amount greater than the expected amount of delay in the communication network over which the audio information is sent so that the audio is received by the mobile device(s) at or before the video is displayed on the display device. For example, in some embodiments, the expected delay in the communication network may be 5-6 seconds, and therefore the video information may be delayed, for example, by 8-10 seconds before being displayed so that the audio is received by the mobile device(s) prior to display of the video and can be further delayed by the mobile device to synchronize the audio with the video. The signal provided to the display device may include the audio information and/or other information. The amount by which the information provided to the display device (i.e., the video and optionally the corresponding audio and/or other information) is delayed may be fixed or variable/configurable. An application running in the mobile device provides for adding additional delay to the received audio information so that the audio can be synchronized to the corresponding video on the display device (typically, the amount of delay is continuously variable from zero to some predetermined maximum in some predetermined increment, such as in millisecond increments). The application may allow the user to manually add the delay to the audio, e.g., using various types of controls, and/or the application may automatically add delay to the audio pursuant to various synchronization protocols.

Among other things, such audio forwarding with video delay allows one or more users to listen to the audio portion of an A/V signal through his or her respective mobile device, with each user being able to control the delay added to the audio by the mobile device, volume/muting of the audio, and other parameters. Such individualized rendering and control of the audio may be useful in many contexts, such as when video is displayed without audio in locations such as sports bars, restaurants, recreational facilities, shopping centers, airports, and other locations or generally when private or individualized rendering of the audio associated with an A/V signal is desired. Embodiments of the present invention generally provide value-add to advertisers and content providers, who benefit by having users listening to commercials when they otherwise might be looking away from the display device.

Audio Forwarding with Video Delay by Separate Processing Unit

Figure 1:
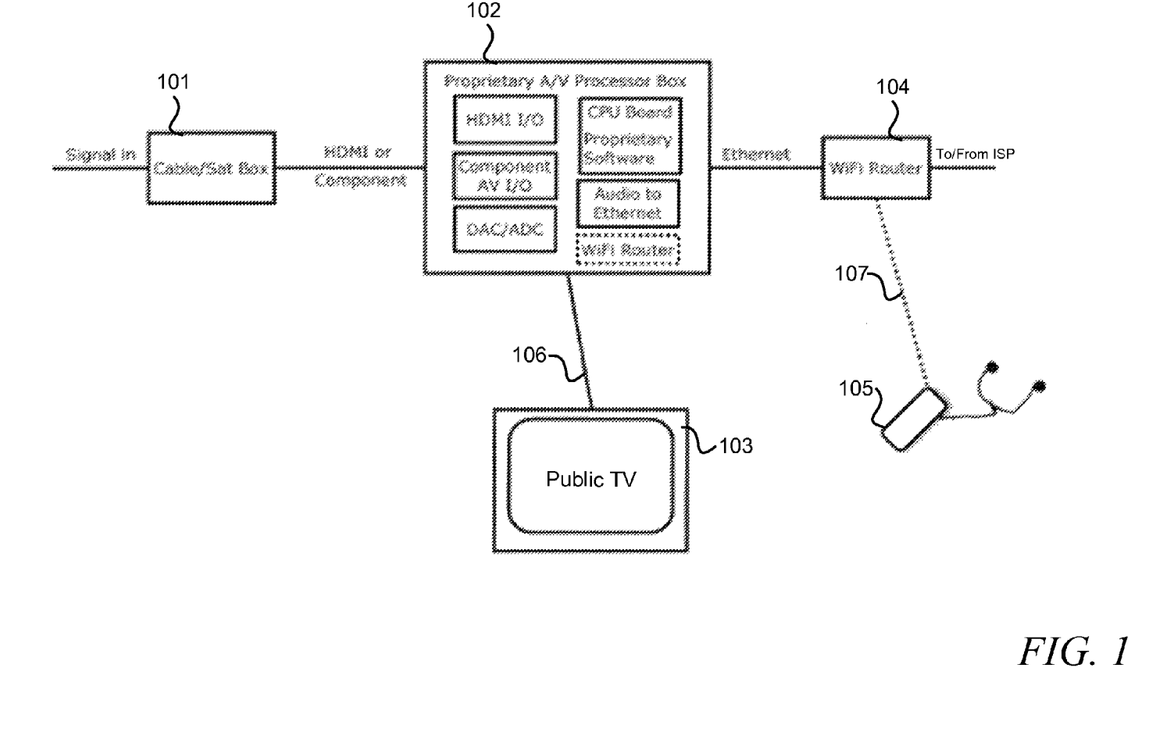
FIG. 1 schematically shows a system in which an audio/video processor distributes audio and video information associated with an audio/video signal, in accordance with various embodiments of the invention.

FIG. 1 shows a schematic of a system including a processing unit 102 that performs audio forwarding with video delay, in accordance with various embodiments of the invention. As discussed further below, audio forwarding with video delay schemes in accordance with embodiments of the present invention typically allow audio and/or other information to be provided along with the delayed video to the display device (such information is typically delayed so as to be in synchronization with the delayed video) and may additionally or alternatively allow video and/or other information to be forwarded without delay along with the audio to the mobile device(s). Among other things, the processing unit 102 includes an interface to one or more display devices 103 (e.g., HDMI, component, composite, S-video, DVI, coaxial, wireless, or other interface) and an interface for communicating with one or more mobile devices 105 (in this example, an Ethernet interface for connecting to a wireless router or other communication device, although the processing unit may include an integral wireless router, cable modem, or other communication/networking device).

The processing unit 102 may obtain A/V signals from external and/or internal sources. In FIG. 1, unit 102 includes an interface to an external A/V signal source 101 (in this case, a cable or satellite set top box that may include an analog or digital television tuner, an internal DVR, and/or a modem for video-on-demand and other digital services, coupled to the unit 102, for example, via HDMI, component, composite, S-video, DVI, coaxial, or other interface). Additionally or alternatively, unit 102 may include one or more internal A/V sources, such as an analog or digital tuner, an integrated DVR, an integrated Internet video streaming device, or other type of device.

Among other things, unit 102 includes appropriate hardware and/or software for sending at least the audio portion of a television signal to one or more mobile devices 105 over a communication network (e.g., a wireless network or the Internet) and sending at least the corresponding video portion delayed to one or more display devices. Mobile device 105 may be a smart phone with an application that delays audio for fine tuning. The user may control the variable delay. The user may connect to a server to activate the audio. Advertisements may be displayed on the mobile device screen.

In some embodiments, unit 102 may transmit essentially the same information to both the mobile device 105 and the display device 103, but with the signal provided to the display device 103 delayed. For example, unit 102 may obtain packets of digitized audio/video information (e.g., from an external or internal source), forward the packets to the mobile device 105 over the communication network, and after the predetermined amount of delay, forward the packets to the display device or decode the packets and send decoded information to the display device.

More typically, however, unit 102 decodes the A/V signal information to recover at least the audio portion and transmits the audio portion to the mobile device 105 over the communication network. This may involve, for example, decoding the television signal to recover the analog audio portion, digitizing the analog audio portion using an analog-to-digital converter, and encoding the digitized audio for transmission over the communication network and subsequent receipt of the digitized audio by the mobile device(s). The message may be encoded in any format suitable for receipt by the mobile device.

In FIG. 1, unit 102 sends a signal 107 containing the audio information to a mobile device 105 over a wireless network via a wireless router 104 connected to the unit 102 via an Ethernet port, although it should be noted that the wireless router may be integral to the unit 102. It also should be noted that unit 102 additionally or alternatively may send the signal containing the audio information over the Internet or other communication network. Unit 102 also sends a signal 106 containing delayed video information to the display device 103. The signal 106 sent to the display device 103 typically, but not necessarily, includes the corresponding audio information delayed in synchronization with the video, e.g., so that the audio can be played from the display device if desired and may include other video elements inserted into the video stream. As discussed above, the video information provided to the display device is delayed by a predetermined amount (which may be configurable) so that the audio is received by the mobile device 105 at or before the video is displayed on the display device.

Thus, processing an A/V signal may include adding a delay to the video component of the A/V signal, e.g., via the software, before the video component is routed one or more other display devices 103. For display devices that receive both a video and audio component of the A/V signal, the audio component of the A/V signal being sent to that display device may also be delayed in conjunction with the video. The amount of delay may be fixed or variable/configurable and may be determined as a function of the delay incurred between the transmission of the audio signal to a mobile device 105 and the actual arrival of that signal at the mobile device 105.

Unit 102 may be configured to modify and/or supplement the video and/or audio portions provided to the display device 103 and/or the mobile device 105. For example, unit 102 may be configured to add additional information such as a video advertisement to the A/V signal being transmitted to the display device 103. The advertisements may be in a dynamic video or still image format. These advertisements may be added to the video in a variety of display formats, including but not limited to, a horizontal or vertical split screen view, a border, a banner, or any other format specified by the content provider. The advertisements may be downloaded from a server and may be obtained from a third party source such as, for example, an online advertiser.

Similarly, unit 102 may add a device identifier to the signal provided to the display device so that users can identify different display devices on which different video is being displayed. An application running on the mobile device (discuss in more detail below) may allow the user to selectively receive the audio associated with a particular display device based on the device identifier. Audio information associated with different display devices may be provided on different physical or logical communication channels (e.g., different wireless frequencies, different logical connections, etc.).

In various alternative embodiments, unit 102 may be implemented as a stand-alone unit or may be integrated with a cable/satellite set top box, DVR, TV streaming device, computer, or other type of device or combination of devices. Thus, the audio forwarding with video delay functionality may be integrated into set top boxes, DVRs, TV streaming devices, computers, and other types of devices. When integrated with a DVR, TV streaming device or another existing device, such as those listed above, existing hardware components within these devices, such as a modem, a decoder, a television tuner, etc. may be leveraged and used to implement functions associated with some embodiments of the present invention. For example, when integrated with cable/satellite set top box functionality, the existing tuner of the cable/satellite set top box may be used to receive and decode A/V signals, and an existing modem may be used to communicate audio and other information to one or more mobile devices. Set top boxes often include DVR and/or video-on-demand functionality that can be used as the source of A/V signals. When integrated with TV streaming device functionality, the existing device capabilities may be used to receive A/V signals from external sources, record A/V signals, playback A/V signals on the display device, and communicate with one or more mobile devices using existing Internet capabilities that allow the mobile device to access the unit 102, receive audio and other information, and remotely control the unit 102 and external devices.

Logic Flow for Audio Forwarding with Video Delay

Figure 3:
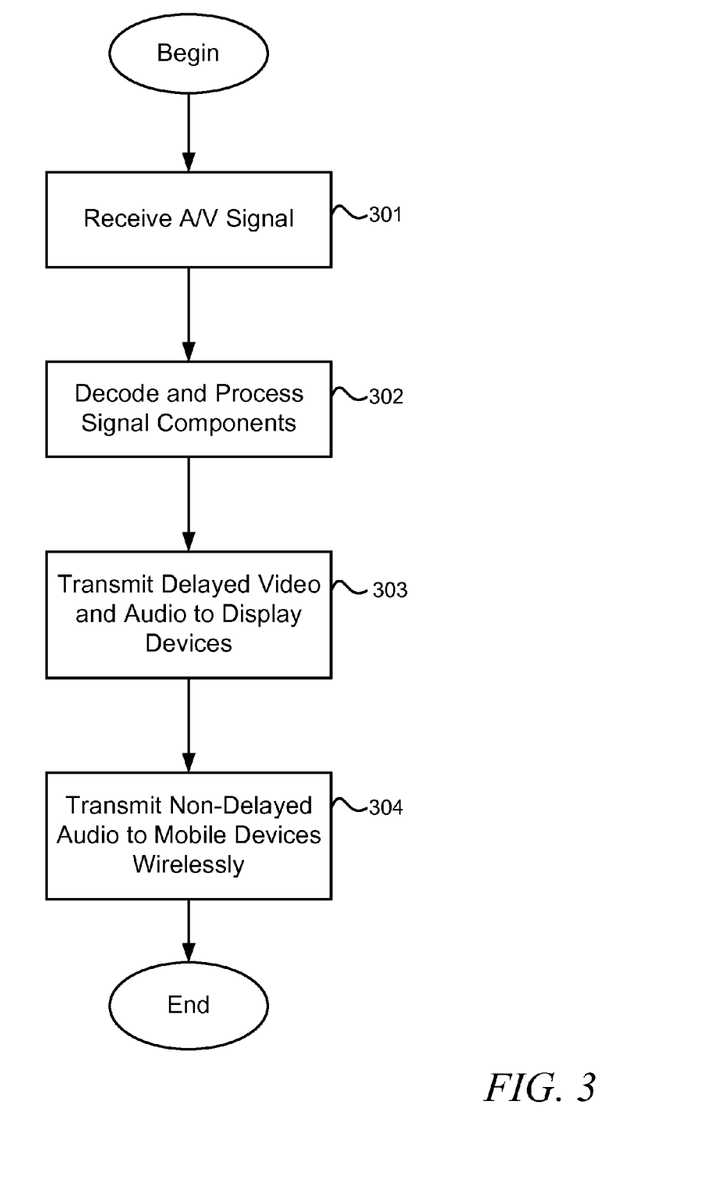
FIG. 3 schematically shows a flow diagram demonstrating processing of a television signal in accordance with various embodiments of the invention.

FIG. 3 shows a flow diagram demonstrating processing of an A/V signal in accordance with various embodiments of the invention. The process begins with receipt of the audio and video signal at step 301. The audio and video signal may be components of a television signal transmitted from a satellite or cable service provider. Once the signal(s) are received, the signal may be decoded and components of it modified in step 302 by a signal processor. Modification of the signal may include adding a delay to the video portion of the signal. The amount of the delay will be specified to accommodate the perceived delay in the audio transmission to a mobile device. Modification of the signal may include adding other media, such as advertisements to the video portion of the signal. Modification may also include adding delay to the audio portion of the signal being sent with the video portion of the signal. In step 303, the delayed video and audio signal may be transmitted to a public display device with or without additional advertisements. In step 304, the non-delayed audio signal may be transmitted to a mobile device, for example, a smart phone, via a wireless router. The non-delayed audio signal sent to the mobile device is distinct from the delayed audio signal sent to the display device by virtue of it being sent without a delay being actively added to it. As discussed above, the non-delayed audio referred to throughout the application represents audio that is sent through a communications network to a mobile device without a delay being purposefully added to it; however, this audio will inherently experience a delay due to the transmission of the audio over the network.

Audio Forwarding with Video Delay by Content Provider

Figure 2:
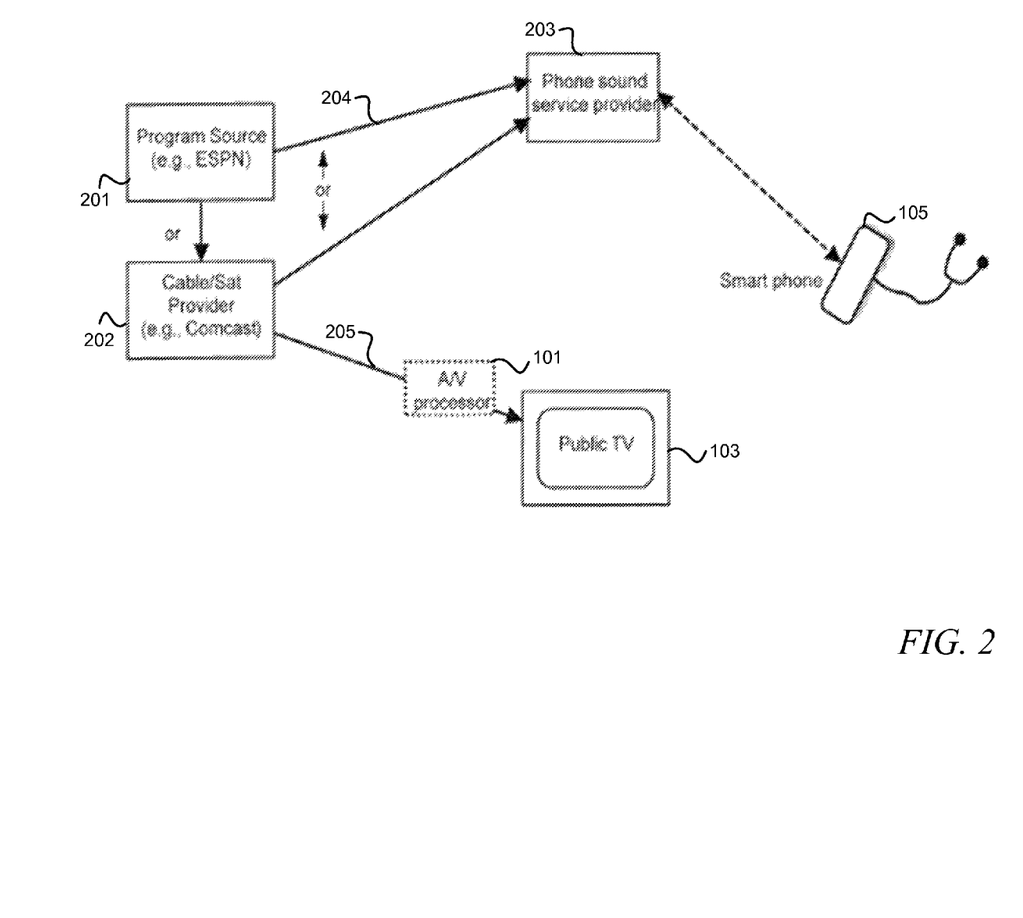
FIG. 2 schematically shows a system in which the audio/video source distributes audio and video information associated with an audio/video signal, in accordance with various embodiments of the invention.

In an alternative embodiment, rather than having a separate processing unit perform the audio forwarding with video delay functionality, a content provider may perform its own audio forwarding with video delay. For example, as shown in FIG. 2, a content provider 201, 202 such as a satellite provider, a cable provider, or a terrestrial broadcaster or other program source, may transmit the audio portion 204 of an A/V signal without delay to one or more mobile devices 105 over first communication network 203 (e.g., a phone sound service provider such as an independent provider or the content provider itself through an appropriate license arrangement) such as a cellular telephone network or the Internet and transmit the A/V signal 205 itself with delay over its distribution system, e.g., for reception by cable/satellite box 101 at the viewing location. The delay could originate at the source or by an A/V processor at the destination, e.g., a box provided by the cable/sat provider. As discussed above, the delay added to the signal provided to display device 103 must account for the delay in transmission of the audio to mobile device 105. The audio signal transmitted to device 105 may include any additional content desired, such as an advertisement. In this embodiment, the mobile device 105 still includes an application, which may be used to add any additional delay required to improve the synchronization of the audio signal with the video signal displayed on device 103. The mobile device user may log on with the phone sound service provider 203. The mobile device user may adjust delay to synchronize the audio. Advertisements may be displayed on the mobile device screen. Use and user data may be compiled by the service provider.

Mobile Device Application Software

Whether receiving audio information from unit 102 or directly from a content provider, the mobile device 105 typically includes a software application that allows the device to access and control the audio, including adding a continuously variable amount of delay to the audio. The application may allow for connection to the unit 102 or other provider, similar to the way the SLINGPLAYER™ software provided by Sling Media allows mobile devices to access a SLINGBOX™ over the Internet. The application may provide a slider bar or other control for manually adjusting the amount of delay added to the audio. Additionally or alternatively, the incremental delay may be implemented automatically by the application, e.g., using a synchronization protocol. The application may allow for user control of other functions, e.g., volume/muting control of the audio. The application may also allow the user to pick from a variety of audio sources coordinated with display devices based on the user's location, e.g., by specifying the identifier associated with a display device at the user's location. The user's location may be implicit, e.g., by virtue of being within range of an identifiable wireless transceiver or processing unit, or explicit, e.g., using GPS or other location identifying means, to determine the user's location and hence available display devices. Accordingly, each mobile device receiving the audio signal may add incremental delay to the audio signal to provide device specific or network specific delay times.

In some embodiments, the application may be configured to display advertisements or other information on the screen of the mobile device during transmission of the audio to the mobile device. This information may be provided along with the audio or may be provided separately from the audio. Advertisements may be displayed while the application is in the process of accessing the audio information and/or during playback of the audio information. Advertisements to be displayed on a particular mobile device may be selected, for example, based on a location of the mobile device (e.g., based on, for example, the location of the unit 102, GPS information provided by the mobile device, or other location identifying information), the identity of the mobile device (e.g., based on the phone number, serial number, or communication address of the device), the identity of the user (e.g., based on a login name used to access the audio information), the content being displayed on the display device, the type/nature of the location (e.g., bar, airport, department store, etc.), or other information.

Information about the mobile device(s) that are receiving the audio information may be collected and provided to marketing and other entities. Such information may include, for example, the location, the A/V signal or channel being watched, the number of users watching an A/V signal or channel, and other information.

Exemplary Synchronization Protocol

Figure 4:
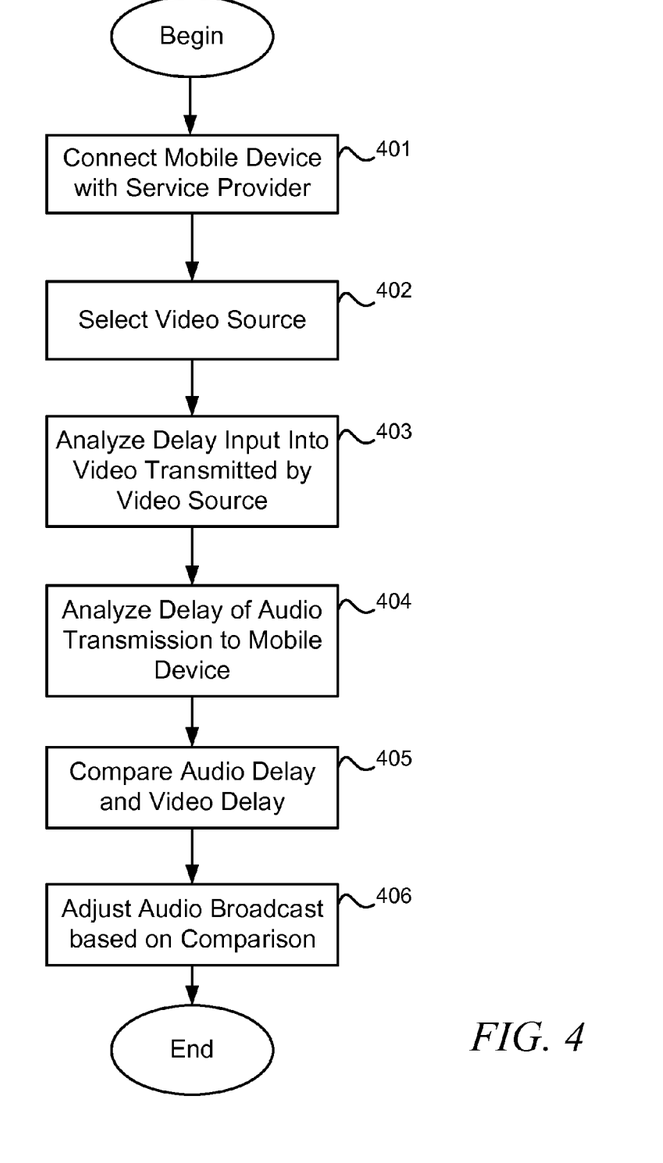
FIG. 4 schematically shows a flow diagram for synchronizing the audio provided to a mobile device with a video signal displayed on a display device in accordance with various embodiments of the invention.

FIG. 4 shows a flow diagram for synchronizing audio provided to a mobile device with a video signal on a display device in accordance with various embodiments of the invention. The flow diagram depicted in FIG. 4 shows how an application running on the mobile device or accessible by the mobile device may be configured for automatically adding delay to the received audio information by the application running in the mobile device. It should be noted that automatically adding delay is optional and may be used in lieu of, or in addition to, manual delay controls. Thus, for example, the application may support only manual delay adjustment, only automatic delay adjustment, or both automatic and manual delay adjustments.

In step 401, the application connects the device with a service provider capable of sending the audio signal to the mobile device. In step 402, the application selects a video source, which represents the video display with which the audio provided to the mobile device will be synchronized. The application analyzes the delay added to the video transmitted by the video source in step 403. The application analyzes the audio delay incurred by the wireless transmission to the mobile device in step 404. The requirements may depend on the device and may depend on the network's available rate of data transfer. In step 405, the delay input into the video is compared with the delay incurred during the audio transmission. In step 406, broadcast of the audio on the mobile device is adjusted to improve the accuracy of the mobile audio synchronization with the video display.

Alternative Processing for when the A/V Source is Changed

In some embodiments of the present invention, when the A/V source is changed (e.g., the channel is changed), it is desirable to immediately show on the video display that the A/V source has changed (e.g., by displaying some video content from the new A/V source), as opposed to delaying the video for the extended time described above (the audio for the new A/V source can be forwarded to the mobile device without delay). Of course, at some point, the video needs to be delayed as discussed above so that the mobile device(s) receive the audio before the corresponding video display. Various embodiments of the present invention may engage one of numerous options to display video information during this time lapse after the A/V source is changed. For, example the processing unit may cause display of a still shot during this programming interruption. The still shot may display a message, for example indicating that the new channel will be displayed in a few moments. Alternatively, the still shot may simply include a blank screen, such as a blue screen. In other embodiments, the still shot could display an advertisement. Additionally or alternatively, a progress indicator (e.g., a progress bar or countdown) may be displayed to give viewers an indication of when the video from the selected A/V source will be displayed.

Other embodiments of the present invention may accommodate this lapse by displaying an alternative video. The alternative video may also be an advertisement. The source of the alternative video may be a direct and non-delayed signal from the video signal source. In embodiments where the source of the video are a direct and non-delayed videos from the signal source, the display device would alternate from receiving the delayed video to receiving a non-delayed video and then switch back to a delayed video associated with the new channel.

In exemplary embodiments, if any button on the television remote control is pressed, the circuitry in the A/V processor unit detects activation of the remote control and immediately switches to the real time source by routing the A/V signal around the delay circuit and connecting it directly to the television. After a predetermined time has passed, for example 15 seconds, the processor unit may discontinue routing the non-delayed signal to the television and resume engaging the delay circuit to route the delayed A/V signal to the television. Each activation of the remote control may bypasses the delay circuit for the predetermined time.

In the event that there are multiple televisions in the same area, each A/V processor box may include a circuit capable of (e.g., at initial setup) learning the identifier codes transmitted by the TV remote control that belongs to the TV attached to that box. Therefore, each A/V processor only acts on the remote control learned by that box.

Mobile Device as an Input Device

Other embodiments of the present invention include the use of a mobile device, such as a smart phone, as an input device for a display device. The system and smart phone application permit the phones or devices equipped with the application to be an input device to interact with the content on the public display device—for example, to respond to questionnaires, enter contests, or request sending of product information to the smart phone owner's e-mail address, which is already programmed into the phone. Requested information may even be immediately downloaded to the smart phone for later retrieval.

Mobile Device as Television Remote Control

Other embodiments of the present invention include the use of a mobile device, such as a smart phone, as a controller for a display device. Embodiments of the present invention may be applied to public display devices, including televisions with private programming (usually local promotional content), such as televisions mounted on ceilings in malls and retail stores. Certain embodiments of the invention may also apply to public display devices that are meant for a single person viewing or private viewing, e.g., kiosks, personalized content displayed on a public display device, etc. Embodiments of the present invention permit audio corresponding to the display provided on these televisions through mobile devices, such as smart phones.

In these private programming situations, smart phone users may change the program content (for example, choose a product area of interest, or request floor locations of products) by using the smart phone as a remote control to control the display content of the television. For example, the user may select the content from a menu or press specialized buttons that appear on the smart phone screen. In these situations, the user's smart phone screen may change to align with the television presentation. Additionally, requested information may be downloaded to the smart phone for immediate retrieval. All of this is achievable while listening to audio corresponding to the video displayed on the display device.

Offloading Audio/Video Processing

Figure 5:
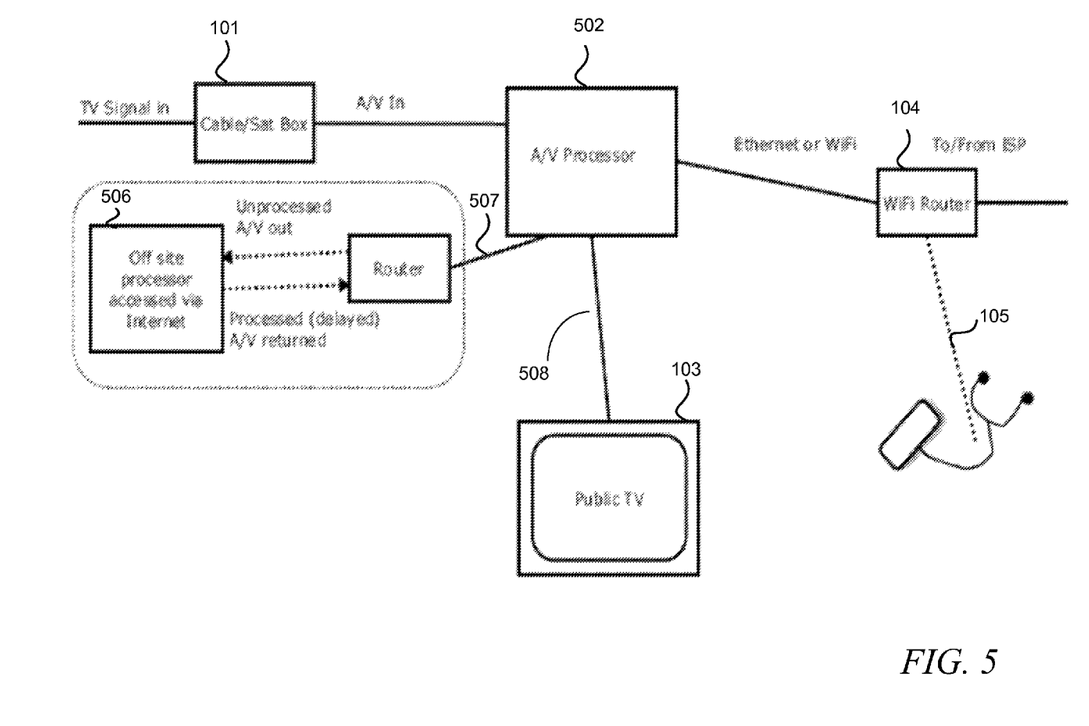
FIG. 5 schematically shows a system in which processing and distribution of audio and video information associated with an audio/video signal is divided between local and remote audio/video processors, in accordance with various embodiments of the invention.

In the embodiment shown and described above with reference to FIG. 1, the A/V processor 102 essentially performs all of the processing of the audio/video signal and distribution of the audio and video information, including adding delay to the video information. FIG. 5 schematically shows a system in which processing and distribution of audio and video information associated with an audio/video signal is divided between local and remote audio/video processors, in accordance with various embodiments of the invention. Here, the local A/V processor 502 (e.g., located in a bar or other establishment near the display device) sends the audio/video signal to an external A/V processor 506, e.g., over the Internet or other network via an Ethernet or WiFi connection 507. The external processor 506 may process audio/video signals for multiple processors 502 situated at the same location (e.g., multiple local processors 502 at a sports bar) and/or at multiple locations (e.g., a central server utilized by local processors 502 situated at different establishments). The external A/V processor 506 returns processed audio and video information to the A/V processor 502 via 507, which then distributes the audio information to the mobile device(s), in this example, via router 104, and distributes the video information 508 to the display device(s). Among other things, some expected advantages of such a distributed processing architecture include simplifying (and hence reducing the cost of) the local processor 502 while the servers that perform the intensive audio/video processing (particularly for HDTV signals) can reside at a central, managed location.

The external A/V processor 506 may return the audio and video information in a variety of forms. For example, the external A/V processor 506 may return undelayed audio information (optionally with undelayed video information) along with delayed audio and video information, such that the local processor 502 can simply forward the undelayed audio (and optionally video) information to the mobile device(s) and forward the delayed audio/video information to the display device(s) with little or no further processing by the local processor 502. Similarly, the external processor 506 may return a combined audio/video signal in which the video information is delayed from the audio information, and the processor 502 may transmit the combined audio/video signal to both the mobile device(s) and the display device(s) without adding any further delay to either transmission path (this solution might be acceptable for situations in which audio will not be played by the display device, although it generally would be unacceptable for situations in which audio will be played by the display device because the signal sent to the display device would include unsynchronized audio and video information). Alternatively, the external processor 506 may return the audio and video information separately, in which case the processor 502 may transmit the audio information to the mobile device(s) and provide delayed video information to the display device(s), substantially as described above (this solution generally would require that the local processor 502 include substantial processing resources capable of adding the delay to the video information and generating the appropriate signals to the display device). The external A/V processor 506 may insert A/V elements into the output stream.

Miscellaneous

Generally speaking, embodiments of the present invention ensure that the audio associated with a video or A/V signal is received at the mobile devices before the video is displayed on the display device, such that delay can be added to the audio manually and/or automatically to synchronize the audio to the video. In some exemplary embodiments described above, delay is expressly added to the video (e.g., by the content provider or by a separate processing unit). In certain alternative embodiments, however, the audio may arrive or be made to arrive at the mobile devices before the video is displayed without expressly adding delay to the video. For example, a content provider may transmit the audio signal over a high-speed medium (e.g., a wireless network such as a cell phone network, or the Internet) while the video or A/V signal traverses a slower-speed medium (e.g., a cable or terrestrial broadcasting system that inherently adds delay to the signal such as from satellite or other transmission devices through which the signal passes). Still, the application in the mobile device can be used to synchronize the audio to the video.

In some exemplary embodiment described above, a fixed amount of delay is added to the video and then a variable amount of delay is added to the audio in order to synchronize the audio to the video. In certain alternative embodiments, however, a fixed amount of delay may be added to the audio and a variable amount of delay may be added to the video to synchronize the audio and video, or variable amounts of delay may be added to both the video and the audio (e.g., the video delay may be variable and may be set to obtain near-synchronization with the expected delay of the audio signal reaching the mobile devices, with a variable amount of audio delay added by each mobile device to fine-tune synchronization and compensate for timing variations as discussed immediately below).

In practice, the amount of delay needed to synchronize the audio to the video may vary over time, for example, based on such things as wireless signal strength, signal interference, varying delays in the transport network (e.g., cell phone network, Internet, etc.), distance from the transmitter, etc. The delay can also be different among users depending on such things as their relative distances from the transmitter and differences in their wireless devices. Thus, certain alternative embodiments of the present invention include provisions for monitoring and matching the relative delays of the audio and video streams automatically over time, with additional adjustments made manually as needed.

In one exemplary embodiment, the application in the mobile device sends "hello" or "ping type messages to the audio content server from time to time (e.g., multiple times per second) and upon receiving responses from the server, measures the round-trip delay and adjusts the amount of audio delay based on the round-trip delay. The round-trip delay is indicative of (but not necessarily equal to) twice the server-to-client network latency. Among other things, this allows the application in each mobile device to adjust the audio delay based on its individual signal reception characteristics.

In another exemplary embodiment, the audio content server may send "hello" or "ping" type messages to the mobile device and upon receiving responses from the mobile device, measures the round-trip delay. In embodiments in which the mobile device adds a variable amount of delay to the audio, the server can report the round-trip delay to the mobile device or provide other information based on the round-trip delay to allow the mobile device to adjust the audio delay. In embodiments in which a variable amount of delay is added to the video signal, the round-trip delay can be used to adjust the video delay to synchronize with the amount of delay added to the audio.

Additionally or alternatively, the separate audio and/or video streams may be time-stamped to allow the mobile device to synchronize the audio to the video. For example, a separate processing unit that transmits the audio to the mobile devices and adds a fixed delay to the video might include in each audio packet an absolute or relative time at which the audio packet is to be played by the mobile device (e.g., if the current time is 12:00:00 and the video is delayed by 5 seconds, then the timestamp on the corresponding audio packet might be 12:00:05, and, assuming the mobile devices receive the audio packet before 12:00:05, each mobile device would hold the audio packet until 12:00:05 and then play it such that synchronization with the video would be substantially achieved provided that the mobile devices are substantially synchronized with the processing unit, e.g., based on a common reference clock such as those available from the Internet or from cellular phone networks). Generally speaking, the time-stamping would need to be sufficiently granular for specifying fractions of a second (e.g., milliseconds). Similar time-stamping could be added to the audio and/or video streams by the content provider.

It should be noted that automatic synchronization is not limited to round-trip delay and time-stamping. Other delay measurement and automatic synchronization techniques may be used to set an initial time delay and/or make incremental adjustments to account for variations over time.

In practice, the mobile devices must be able to recover from various types of error conditions, most typically lost audio packets, but also other error conditions such as audio packets that arrive too late or that arrive out-of-order.

In order to deal with the issue of lost packets, each audio sample may be sent in two independent packets for redundancy. For example, each audio packet may be transmitted in duplicate. As long as one of the packets arrives at the mobile device in time to be played in synchronization with the corresponding video, the mobile device can play the audio information. If the mobile device receives an audio packet too late for the audio packet to be played, the mobile device typically just ignores or discards the audio packet.

Additionally or alternatively, sequence numbers may be included in the audio packets so that the mobile devices can detect if an audio packet has been missed or if audio packets have arrived out-of-order (in which case the packets can be re-ordered into the correct sequence). If duplicate audio packets are transmitted as described immediately above, the sequence number would generally be the same for both duplicate packets.

In the event that one or more audio packets has been missed or packets are not received in time to synchronize with the video (i.e., there is a gap in the audio information received by the mobile device), the mobile device typically injects one or more "dummy" packets to fill the gap left by the missing packet(s). An injected packet may contain no audio data or may contain "dummy" data such as a small level of white noise to match the perceived volume of the surrounding audio (i.e., the audio information received before and perhaps after the missing packet) or audio data interpolated or extrapolated from the surrounding audio data (i.e., the audio information received before and perhaps after the missing packet).

In an exemplary embodiment, the application in the mobile device may be configured to manage the audio packets using a circular buffer. Received packets are placed appropriately into the circular buffer, and "dummy" packets are injected into the circular buffer as needed. Generally speaking, the circular buffer needs to accommodate audio data for at least the amount of time the video is delayed. In situations where the amount of audio delay is variable, the application in the mobile device may make automatic adjustments over time as discussed above. Typically, the application in each mobile device maintains a target delay that represents the combination of such factors as the amount of delay requested by the user, network variations that induce loss or latency changes, and slight variations in the analog-to-digital and digital-to-analog conversion clocks on the server and client respectively. As discussed above, the delay may be adjusted automatically from time to time to compensate for variable network delay. Actual delay may only be measured periodically and with a large (but uniform) error in a user-mode application, so an exponential moving average may be used to predict the true delay with minimal hysteresis. The client then discards packets or injects dummy packets appropriately to match the predicted true delay to the target delay, within a given tolerance.

In certain exemplary embodiments, communication between the processing unit (server) and the mobile devices may utilize universal datagram packets (UDP) over an 802.11 wireless network. A combination of broadcast and host-to-host packets are used to organize the network, transmit audio data, and measure network latency. The server typically broadcasts its IP address to all subnet IP addresses periodically, and if a client mobile device is on the subnet, it will receive the server broadcast and can initiate communication with the server. As discussed above, each client periodically sends beacon packets to the server to indicate that the client still is participating in the network. In certain embodiments, the server aggregates client information and includes this information in the beacon, so clients may initiate their own peer-to-peer connection on the subnet without the assistance of the server. The server typically sends audio data as PCM samples which are compressed using the DEFLATE algorithm (gzip implementation). The compression allows scaling the audio stream to different bit-levels of precision without changing the protocol, as the compression will eliminate bits that do not carry information.

In some exemplary embodiments described above, only the audio signal is sent to the mobile devices. In various alternative embodiments, however, both the audio and video signals may be sent to some or all of the mobile devices (the user may be able to choose whether to receive only audio or both audio and video, perhaps for additional cost to receive the video), and the mobile device is configured to synchronize both the audio and video to the video displayed on the separate display device. Such functionality may be useful, for example, to allow the user to continue viewing the video even when away from the separate device or when viewing of the separate display device is obstructed.

It should be noted that the application in the mobile device provides not only the synchronization functionality and related functionality (e.g., provision features such as registration for the service, logging into the service, accepting payments relating to the service, user authentication for the service generally and/or for specific features such as restrictions on particular television channels, and capturing usage information) but also represents a platform from which additional functionality can be provided. For example, the application may include an interface for playing games that are specifically tied to the TV programming such as sports games or quiz show games. Individual responses to these games may be scored via the Internet. These games could be played individually or in social groups. Furthermore, the application may include additional social network features including connecting with others in the local site (e.g., the sports bar) or connecting with others who are not local (at home, for example). Here the non-local people could see the same mobile screen info (e.g., fantasy sports games mentioned above) and be included in group scoring. Games could include players from multiple locations all aggregated over the Internet (e.g., people in different bars all playing the same trivia game). The application for the mobile devices may be a separate application designed specifically for the audio/video synchronization service or may be a third party application (e.g., an application for a smart phone designed for receiving television programming or video-based content) to which the audio/video synchronization functionality is added.

In some exemplary embodiments described above, a processing unit may process A/V signals for multiple programs, even from multiple sources. For example, the processing unit may process multiple television channels (e.g., received from cable, satellite, or over-the-air broadcasts) as well as content obtained from the Internet and even locally generated content (e.g., from a local server in communication with the processing unit or from the processing unit itself), with different video streams sent to different televisions or monitors and the corresponding audio distributed as discussed herein. In this way, for example, the processing unit may process any of a variety of "custom" A/V signals designed specifically for the service such as, for example, a channel that contains advertisements, entertainment (trivia quizzes, quotes, etc.), news, weather, sports scores, etc.

It should be noted that, while some exemplary embodiments are discussed above with regard to specific applications and locations (e.g., sports bars, malls, etc.), the present invention is not limited to any particular applications and locations. Thus, for example, embodiments of the present invention may be used in applications including without limitation restaurants and bars, malls and stores, nightclubs, museums, stadiums, billboards, schools (e.g., lecture halls), theaters (including drive-in theaters), concerts, amusements, and guided and unguided tours, and other indoor and outdoor venues for, among other things, providing convenient wireless audio to accompany and enhance such things as TV viewing, location-based (place-based) advertising, digital out-of-home applications, electronic signage, and digital signage, using wireless audio (and video) receiving devices that millions of people carry with them every day.

The technology is particularly useful for situations in which it is impractical to play audio through speakers, such as environments that are too noisy to hear the audio (e.g., pubs, stadiums), environments in which there are different video programs that would require multiple concurrently-played audio programs (e.g., sports bars, shopping centers), environments in which different audio programs are provided for a video (e.g., multi-language versions of the audio), environments in which the viewers are not congregated at a single location or otherwise are unable to hear the audio (e.g., due to distance or because of physical barriers such as viewing through a window), environments that require quiet or silence (e.g., libraries, hospitals, houses of worship, homes), and environments in which no audio equipment is available for playing the audio (e.g., audio for a portable video system can be provided wirelessly without having to lug around an audio amplifier and speakers). Generally speaking, embodiments of the present invention may be employed in any of a wide variety of indoor and outdoor venues, in and/or on any of a wide variety of structures and vehicles, with stationary or mobile video displays, and for any of a wide variety of applications including public and private showings, advertising applications, and "digital signage" applications. Without limitation, the described technology may be employed in the following types of locations and situations:

Arts, Entertainment and Recreation, e.g., theaters, drive-in movies, zoos, aquariums, tourist sites, gyms, spas, concerts, shows, exhibitions, amusement parks, multimedia presentations, laser light shows, planetaria, IMAX™ theaters.

Banking and Finance, e.g., retail locations of banks, credit unions, brokerage companies, ATM locations.

Bars, Pubs, Nightclubs, Casinos, e.g., sports bars where one or more TVs are often used to show one or more sporting events, dance clubs (e.g., "silent" dances where no music is played through speakers and all audio is carried wirelessly to personal audio players).

Corporate Communications, e.g., office building lobbies, elevators, meeting rooms, training rooms, auditoriums, warehouses, cafeterias, advertisements, motivational/inspirational messages.

Digital Out-Of-Home Networks, e.g., doctor's offices, convenience stores, gas stations, public buildings, WiFi hotspots.

Educational Facilities, e.g., schools, colleges, universities, training sites, libraries, museums, lecture halls, testing rooms, driver's education courses, bar exam review courses, group learning environments, personal learning environments.

Government Facilities, e.g., local, county, state, federal, administrative (e.g., registry of motor vehicle locations for such things as learner's permit testing, remedial driving school, etc.), public service announcements and alerts.

Healthcare, e.g., hospital waiting rooms, group areas, nursing homes, assisted living facilities, rehabilitation centers.

Homes, e.g., wireless audio for TV or music, multi-room synchronized audio and video.

Hotels, Motels, Resorts, e.g., lobbies, poolside video, ski lodges.

Houses of Worship, e.g., in churches, temples, mosques and other religious building for such things as broadcasting ceremonies (e.g., religious services, sermons, religious rites, weddings, Baptisms, Bar and Bat Mitzvahs), to enable silent prayer, to support multi-language events (e.g., a presentation given in English and Hebrew), or to distribute information such as event and holiday schedules, inspirational messages, promotions.

Public Spaces, e.g., public access buildings, city square electronic display boards such as in Times Square, public events, roadside signage, traffic signage.

Restaurants, e.g., fast food restaurants, diners, full service restaurants, coffee houses.

Retail, e.g., retail stores, strip centers, malls.

Stadiums and Arenas, e.g., sports stadium electronic display boards such as video replays on stadium "jumbo boards," concert halls, auditoriums, trade shows.

Transportation, e.g., in transportation buildings (e.g., airports, train and bus stations, ship ports), onboard vessels (e.g., airplanes, cruise ships, buses, trains, ferries, taxis, limos).

Electronic signage, e.g., stationary signage (e.g., billboards, placards, stadium displays, digital menu boards), portable signage, mobile signage (e.g., signs placed on moving vehicles such as buses, trains, cars, trucks, blimps that are frequency at large sporting events).

Multiple Location Viewing, e.g., multi-location synchronized viewing (e.g., movies, TV shows, sporting events), multi-location gaming (e.g., online gaming), multi-location testing (e.g., such as for SATs, PSATs, LSATs, online universities), simulcasting.

Projected Video, e.g., a video projector or other projection device (e.g., laser light show) used to project video onto a surface (e.g., an indoor wall or ceiling, an outdoor surface such as the side of a building, etc.) with accompanying audio provided wirelessly.

"Silent" Events, e.g., silent dances in which music is distributed wirelessly and synchronized as discussed herein, optionally in conjunction with videos (such as music videos) being shown on one or more monitors. Among other things, different videos may be shown on different monitors and people may have the ability to independently choose which audio stream to receive for listening/dancing such that different people may be dancing to different music at any given time and people can switch between the different audio programs as they move around and dance with other people (e.g., tune-in to a slow song to slow-dance with one person, then tune-in to a fast song to dance with a group of people). Among other things, such functionality allows for different types of music and different types of dances to be ongoing at the same time, e.g., a ballroom dance, a square dance, a line dance, a hip hop dance, a salsa dance, and a disco dance all happening at the same time, where people can switch from one dance to another at any time.

Silent dances have been gaining in popularity as they allow for parties to be held without violating noise ordinances in such places as apartments, condominiums, dormitories, and even outdoors, although silent dances are generally held using wireless headsets that are tuned to receive a broadcast audio signal without any particular synchronization or simply by having all participants download a common playlist and attempt to play the playlist at the same time. Embodiments of the present invention avoid the pitfalls of such approaches (e.g., distributing headsets is expensive and there are hygienic issues involved with sharing headsets among strangers, while playlists are static and require that all participants manually attempt to synchronize the audio, for example, by pressing "play" on their respective devices at the same time, which even then does not ensure synchronization due to inherent differences between devices) while providing for enhanced functionality such as multiple audio/video programs.

Of course, such "silent" events do not necessarily need to be silent, as there can be background audio played aloud and users can selectively choose (i.e., by wearing or removing their earpieces) whether to listen to the background audio or participate in one or more audio programs. Among other things, this allows for different types of functions to be held at the same location. For example, a "silent" event may include a sports bar in which some people are watching a game with the audio played aloud while at the same time a "silent" dance is being held next to the bar. For another example, a "silent" event may include a presentation in which a lecturer is speaking to a group of people but alternative video presentations are displayed on monitors with the corresponding audio provided and synchronized wirelessly, allowing users to selectively listen to the lecture and/or watch a video.

It should be noted that embodiments can provide for different audio streams to be provided to different mobile devices, e.g., some users may want English language, some users may want Spanish language, etc.

It should be noted that the synchronization techniques described herein can be used to synchronize audio/video playback on local and mobile devices. For example, upon receipt of an A/V signal such as a television program by a processing unit, the processing unit may delay the entire A/V signal provided to an attached television while transmitting the A/V signal to the mobile devices over the wireless network such that each mobile device synchronizes the received A/V signal to the A/V signal on the television as described above.

While some exemplary embodiments are described above with reference to synchronizing audio and/or video on a mobile device to a reference signal, it should be noted that some alternative embodiments may provide for the mobile device to receive audio and/or video information without synchronizing to a reference signal. Thus, for example, the application running in the mobile devices may include one, the other, or both of a mode of operation in which audio and/or video information is synchronized to a reference signal and a mode of operation in which audio and/or video information is received and played without synchronization to a reference signal. As but one example, an exemplary embodiment may permit a museum or tour operator to provide the mobile device with unsynchronized general audio and/or video information in one exhibit (e.g., when the user is looking at a painting or sculpture, the user may receive an audio/video presentation about the artwork) and to provide audio information to be synchronized with a video display in another exhibit (e.g., the exhibit may include a video with the audio provided wirelessly to the mobile device so that others people nearby are not disturbed by the audio). The application in the mobile device may be configured to automatically determine when particular content requires synchronization and when other content does not require synchronization and may switch its operation between the two modes accordingly. In doing so, the application in the mobile device may, from time to time, need to synchronize with different reference signals (e.g., a processing unit servicing one exhibit may use different delay parameters than a processing unit (or the same processing unit) servicing a different exhibit, in which case the application in the mobile device may synchronize with the appropriate reference signal.

Thus, embodiments of the present invention may transmit one or more streams of synchronized audio and/or video signals via WiFi or other wireless protocols, where the signals may be received as part of a television or other A/V signal and/or from other sources such as radio, MP3 players, DJ systems, etc.

It should be noted that terms such as "computer," "set top box," and "smartphone," "router," and "modem" may be used herein to describe devices that may be used in certain embodiments of the present invention and should not be construed to limit the present invention to any particular device type unless the context otherwise requires. Thus, a device may include, without limitation, a bridge, router, bridge-router (brouter), switch, node, server, computer, appliance, or other type of device. Such devices typically include one or more network interfaces for communicating over a communication network and a processor (e.g., a microprocessor with memory and other peripherals and/or application-specific hardware) configured accordingly to perform device functions. Communication networks generally may include public and/or private networks; may include local-area, wide-area, metropolitan-area, storage, and/or other types of networks; and may employ communication technologies including, but in no way limited to, analog technologies, digital technologies, optical technologies, wireless technologies (e.g., Bluetooth), networking technologies, and internetworking technologies.

It should also be noted that devices may use communication protocols and messages (e.g., messages created, transmitted, received, stored, and/or processed by the device), and such messages may be conveyed by a communication network or medium. Unless the context otherwise requires, the present invention should not be construed as being limited to any particular communication message type, communication message format, or communication protocol. Thus, a communication message generally may include, without limitation, a frame, packet, datagram, user datagram, cell, or other type of communication message. Unless the context requires otherwise, references to specific communication protocols are exemplary, and it should be understood that alternative embodiments may, as appropriate, employ variations of such communication protocols (e.g., modifications or extensions of the protocol that may be made from time-to-time) or other protocols either known or developed in the future.

It should also be noted that logic flows may be described herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. In a typical embodiment of the present invention, predominantly all of the described logic is implemented as a set of computer program instructions that is converted into a computer executable form, stored as such in a computer readable medium, and executed by a microprocessor under the control of an operating system.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

Computer program logic implementing all or part of the functionality previously described herein may be executed at different times on a single processor (e.g., concurrently) or may be executed at the same or different times on multiple processors and may run under a single operating system process/thread or under different operating system processes/threads. Thus, the term "computer process" refers generally to the execution of a set of computer program instructions regardless of whether different computer processes are executed on the same or different processors and regardless of whether different computer processes run under the same operating system process/thread or different operating system processes/threads.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web). Of course, some embodiments of the invention may be implemented as a combination of both software (e.g., a computer program product) and hardware. Still other embodiments of the invention are implemented as entirely hardware, or entirely software.

Without limitation, some additional embodiments of the present invention may be characterized by the potential claims listed in the paragraphs following this paragraph (and before the actual claims provided at the end of this application). These potential claims form a part of the written description of this application. Accordingly, the subject matter of the following potential claims may be presented as actual claims in later proceedings involving this application or any application claiming priority based on this application:

1. A method of synchronizing an audio and video signal comprising: receiving an audio/video signal; forwarding the audio signal to a first device without delay; and forwarding the video signal to a second device with a delay.

2. (Entire system): A system for synchronizing audio distributed to a mobile device with a video displayed on a display device, the system comprising:
   a. a processing unit including
      i. a receiver for receiving an A/V signal,
      ii. a decoder configured to separate the A/V signal into a video and an audio component,
      iii. a video encoder configured to add a delay to the video portion of the A/V signal, and
      iv. at least one transmitter configured to transmit at least one of the encoded video and the audio components of the A/V signal;
   b. at least one display device connected to the transmitter of the processing unit, the display device receiving the encoded video component of the A/V signal from the processing unit; and
   c. a router connected to the transmitter, the router configured to receive the audio signal from the transmitter and wirelessly transmit the audio signal to a mobile device without the delay.

3. (Set Top Box): A system for distributing audio to a mobile device in synchronization with video displayed on a display device, the system comprising:
   a. a processing unit including
      i. a receiver configured to receive an A/V signal transmitted from a service provider,
      ii. a demodulator configured to separate the A/V signal into a video and audio component,
      iii. an encoder configured to add a delay to the video component of the A/V signal, and
      iv. a transmitter configured to transmit the encoded video component of the A/V signal to a display device and transmit the audio portion of the A/V signal to a mobile device without the delay.

4. (Program/Sequence running in box top unit): A system for synchronizing audio received on a mobile device with a video displayed on a display device, the system comprising:
   a signal processor, the signal processor configured to receive a video signal and an audio signal from a service provider, transmit the video signal to a display device with a delay, and transmit the audio signal to a mobile device without the delay, wherein the delay is selected such that the video signal will be displayed on the display device after receipt of the audio signal by the mobile device.

5. (App on Processing Unit) A computer program product for synchronizing audio on a mobile wireless device with a delayed video displayed on a display device, the computer program product comprising a computer usable medium having computer readable program code thereon, the computer readable program code comprising:
   a. program code for determining an arrival time of an audio signal at the mobile device, the audio signal wirelessly transmitted to the mobile device without a delay
   b. program code for delaying transmission of a video signal to a display device based on the arrival time of an audio signal at the mobile device such that the video signal is transmitted to the display device in synchronization with the audio on the mobile device in synchronization with the delayed video being displayed on the display device.

6. (automatic mobile audio sync.) A computer program product for synchronizing audio on a mobile wireless device with a delayed video displayed on a display device, the computer program product comprising a computer usable medium having computer readable program code thereon, the computer readable program code comprising:
   a. program code for determining a display time for the display of the delayed video on the display device
   b. program code for incrementally adjusting the amount of delay by which the audio signal is broadcast on the mobile device such that the audio signal broadcasts on the mobile device in synchronization with the delayed video being displayed on the display device.

7. (manual mobile audio sync.) A computer program product for synchronizing audio on a mobile wireless device with a delayed video displayed on a display device, the computer program product comprising a computer usable medium having computer readable program code thereon, the computer readable program code comprising:
   b. program code for incrementally adjusting the amount of delay by which the audio signal is broadcast on the mobile device such that the audio signal broadcast on the mobile device in synchronization with the delayed video being displayed on the display device.

8. A method for synchronizing audio and video, the method comprising:
 transmitting audio information associated with an A/V signal to at least one mobile device over a communication network that delays delivery of the audio information to the at least one mobile device;
 transmitting to at least one display device video information associated with the A/V signal delayed by a predetermined delay greater than the delay introduced by the communication network.

9. A method according to claim 6, further comprising:
 adding further delay to the audio information by each mobile device to substantially synchronize the audio with the video displayed on the display device.

10. Systems, apparatus, and methods according to claims 1-9, further including one or more of the following:
 transmitting advertisements to the display device;
 transmitting advertisements to the mobile device;
 basing the advertisement on the location of the mobile device and/or owner of the mobile device;
 basing the advertisement on the location of the display device and nature of business within which the display device is located;
 alternating the display device source from a delayed source to an non-delayed source and back to a delayed source;
 transmitting delayed audio to the display device;
 using the mobile device to remotely control the display device; and
 using the mobile device to generate messages for display on the display device.

11. An external audio/video processor for use in combination with one or more local audio/video processors, wherein the external audio/video processor processes audio/video signals transferred from the local audio/video processor(s) and returns processed audio and/or video information back to the local audio/video processor(s) for distribution to one or more mobile devices and one or more display devices as described herein.

The present invention may be embodied in other specific forms without departing from the true scope of the invention. Any references to the "invention" are intended to refer to exemplary embodiments of the invention and should not be construed to refer to all embodiments of the invention unless the context otherwise requires. The described embodiments are to be considered in all respects only as illustrative and not restrictive.

What is claimed is:

1. A method of processing an audio/video signal by an audio/video processor to allow for synchronization of video and audio information, the audio/video processor in communication with a communication system for communication with at least one mobile device and in communication with at least one display device, the method comprising:
 receiving a first audio/video signal;
 transmitting a first signal to at least one mobile device over a communication system, the first signal including audio information associated with the first audio/video signal, the communication system causing delayed reception of the audio information by the at least one mobile device; and
 transmitting a second signal to a display device separate from the at least one mobile device, the second signal including video information associated with the first audio/video signal, the video information delayed relative to the audio information in the first signal by a predetermined amount of delay greater than the amount of delay added to the audio information by the communication system, so that the audio information is received by the at least one mobile device before the video information is displayed on the display device and each mobile device can independently adjust the amount of delay it adds to the received audio information to synchronize audio played by the mobile device with the video displayed on the display device.

2. A method according to claim 1, wherein the processing unit receives the first audio/video signal from an audio/video signal source external to the processing unit.

3. A method according to claim 1, wherein the processing unit receives the first audio/video signal from an audio/video signal source internal to the processing unit.

4. A method according to claim 1, further comprising:
 decoding the first audio/video signal to recover at least the audio information, wherein the first signal includes the decoded audio information.

5. A method according to claim 1, further comprising:
 decoding the first audio/video signal to recover the audio and video information, wherein the first signal includes the decoded audio information and the second signal includes the decoded video information delayed by the predetermined amount of delay.

6. A method according to claim 1, wherein the first signal includes the first audio/video signal and wherein the second signal includes the first audio/video signal delayed by the predetermined amount of delay.

7. A method according to claim 1, further comprising:
 transmitting the first audio/video signal to an external audio/video processor;
 receiving at least undelayed audio information and delayed audio and video information from the external audio/video processor;
 wherein transmitting the first signal includes transmitting the undelayed audio information received from the external audio/video processor; and
 wherein transmitting the second signal includes transmitting the delayed audio and video information received from the external audio/video processor.

8. A method according to claim 1, further comprising:
 transmitting the first audio/video signal to an external audio/video processor;
 receiving a combined audio/video signal from the external audio/video processor, the combined audio/video signal including video information delayed relative to the audio information by the predetermined amount of delay;
 wherein transmitting the first signal includes transmitting the combined audio/video signal received from the external audio/video processor; and
 wherein transmitting the second signal includes transmitting the combined audio/video signal received from the external audio/video processor.

9. A method according to claim 1, further comprising:
 transmitting the first audio/video signal to an external audio/video processor;
 receiving processed audio and video information from the external audio/video processor;
 wherein transmitting the first signal includes transmitting the audio information received from the external audio/video processor; and
 wherein transmitting the second signal includes transmitting the video information received from the external audio/video processor delayed by the predetermined amount of delay.

10. A method according to claim 1, wherein the first signal further includes video information synchronized to the audio information in the first signal, so that each mobile device can independently adjust the amount of delay it adds to the received audio and video information to synchronize audio and video played by the mobile device with the video displayed on the display device.

11. A method according to claim 1, wherein the second signal further includes audio information synchronized to the video information in the second signal, so that the display device can play the audio and video together.

12. A method according to claim 1, wherein at least one the first signal and the second signal further includes additional information that is not in the first audio/video signal.

13. A method according to claim 12, wherein the additional information is added by the audio/video processor.

14. A method according to claim 12, wherein the additional information includes an advertisement.

15. A method according to claim 14, wherein an advertisement provided in the first signal is based on at least one of:
the location of the mobile device;
the identity of the mobile device;
the identity of the mobile device user;
the content being displayed on the display device; and
the nature of the location of the display device.

16. A method according to claim 12, wherein the additional information includes a device identifier provided in the second signal, the device identifier enabling mobile device users to identify the display device for selectively receiving the associated audio information.

17. A method according to claim 1, wherein the amount of delay added to the video information is user-configurable.

18. A method according to claim 1, further comprising:
upon a change from the first audio/video signal to a second audio/video signal, transmitting a third signal to the display device, the third signal including video information not associated with the first audio/video signal or the second audio/video signal.

19. Apparatus for processing an audio/video signal to allow for synchronization of video and audio information, the apparatus comprising:
an audio/video signal receiver;
a communication interface for communication with at least one mobile device;
a display device interface for communication with a display device; and
an audio/video processor coupled to the audio/video signal receiver, the communication interface and the display device interface, the audio/video processor configured to receive a first audio/video signal; transmit a first signal to at least one mobile device over a communication system, the first signal including audio information associated with the first audio/video signal, the communication system causing delayed reception of the audio information by the at least one mobile device; and transmit a second signal to a display device separate from the at least one mobile device, the second signal including video information associated with the first audio/video signal, the video information delayed relative to the audio information in the first signal by a predetermined amount of delay greater than the amount of delay added to the audio information by the communication system, so that the audio information is received by the at least one mobile device before the video information is displayed on the display device and each mobile device can independently adjust the amount of delay it adds to the received audio information to synchronize audio played by the mobile device with the video displayed on the display device.

20. Apparatus according to claim 19, further comprising:
an audio/video interface coupled to the audio/video receiver, over which the audio/video receiver receives the first audio/video signal from an external audio/video signal source.

21. Apparatus according to claim 19, further comprising:
an internal audio/video source coupled to the audio/video receiver, the internal audio/video source configured to provide the first audio/video signal to the audio/video receiver.

22. Apparatus according to claim 19, wherein the audio/video processor is further configured to decode the first audio/video signal to recover at least the audio information and transmit the decoded audio information in the first signal.

23. Apparatus according to claim 19, wherein the audio/video processor is further configured to decode the first audio/video signal to recover the audio and video information, transmit the decoded audio information in the first signal, and transmit the decoded video information in the second signal delayed by the predetermined amount of delay.

24. Apparatus according to claim 19, wherein the audio/video processor is configured to transmit the first signal including the first audio/video signal and transmit the second signal including the first audio/video signal delayed by the predetermined amount of delay.

25. Apparatus according to claim 19, wherein the audio/video processor is configured to transmit the first audio/video signal to an external audio/video processor; receive at least undelayed audio information and delayed audio and video information from the external audio/video processor; transmit the first signal including the undelayed audio information received from the external audio/video processor; and transmit the second signal including the delayed audio and video information received from the external audio/video processor.

26. Apparatus according to claim 19, wherein the audio/video processor is configured to transmit the first audio/video signal to an external audio/video processor; receive a combined audio/video signal from the external audio/video processor, the combined audio/video signal including video information delayed relative to the audio information by the predetermined amount of delay; transmit the first signal including the combined audio/video signal received from the external audio/video processor; and transmit the second signal including the combined audio/video signal received from the external audio/video processor.

27. Apparatus according to claim 19, wherein the audio/video processor is configured to transmit the first audio/video signal to an external audio/video processor; receive processed audio and video information from the external audio/video processor; transmit the first signal including the audio information received from the external audio/video processor; and transmit the second signal including the video information received from the external audio/video processor delayed by the predetermined amount of delay.

28. Apparatus according to claim 19, wherein the audio/video processor is further configured to transmit the first signal including video information synchronized to the audio information in the first signal, so that each mobile device can independently adjust the amount of delay it adds to the received audio and video information to synchronize audio and video played by the mobile device with the video displayed on the display device.

29. Apparatus according to claim 19, wherein the audio/video processor is further configured to transmit the second signal including audio information synchronized to the video information in the second signal, so that the display device can play the audio and video together.

30. Apparatus according to claim 19, wherein the audio/video processor is further configured to transmit at least one the first signal and the second signal including additional information that is not in the first audio/video signal.

31. Apparatus according to claim 30, wherein the audio/video processor is further configured to add the additional information to the transmitted signal.

32. Apparatus according to claim 30, wherein the additional information includes an advertisement.

33. Apparatus according to claim 32, wherein an advertisement provided in the first signal is based on at least one of
the location of the mobile device;
the identity of the mobile device;
the identity of the mobile device user;
the content being displayed on the display device; and
the nature of the location of the display device.

34. Apparatus according to claim 30, wherein the additional information includes a device identifier provided in the second signal, the device identifier enabling mobile device users to identify the display device for selectively receiving the associated audio information.

35. Apparatus according to claim 19, wherein the amount of delay added to the video information is user-configurable.

36. Apparatus according to claim 19, wherein the audio/video processor is further configured, upon a change from the first audio/video signal to a second audio/video signal, to transmit a third signal to the display device, the third signal including video information not associated with the first audio/video signal or the second audio/video signal.

37. Apparatus comprising a non-transitory computer readable medium having embodied therein a computer program that, when run on a computer, performs processing of an audio/video signal to allow for synchronization of video and audio information, the computer program comprising:

computer program instructions for receiving a first audio/video signal;

computer program instructions for transmitting a first signal to at least one mobile device over a communication system, the first signal including audio information associated with the first audio/video signal, the communication system causing delayed reception of the audio information by the at least one mobile device; and computer program instructions for transmitting a second signal to a display device separate from the at least one mobile device, the second signal including video information associated with the first audio/video signal, the video information delayed relative to the audio information in the first signal by a predetermined amount of delay greater than the amount of delay added to the audio information by the communication system, so that the audio information is received by the at least one mobile device before the video information is displayed on the display device and each mobile device can independently adjust the amount of delay it adds to the received audio information to synchronize audio played by the mobile device with the video displayed on the display device.

* * * * *